US010495500B2

(12) United States Patent
Welle et al.

(10) Patent No.: US 10,495,500 B2
(45) Date of Patent: Dec. 3, 2019

(54) FLOW MEASURING INSTRUMENT COMPRISING A WIND VELOCITY SENSOR

(71) Applicant: VEGA GRIESHABER KG, Wolfach (DE)

(72) Inventors: Roland Welle, Hausach (DE); Levin Dieterle, Oberwolfach (DE); Joerg Boersig, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 352 days.

(21) Appl. No.: 15/389,026

(22) Filed: Dec. 22, 2016

(65) Prior Publication Data
US 2017/0184430 A1 Jun. 29, 2017

(30) Foreign Application Priority Data
Dec. 23, 2015 (EP) .................................... 15202464

(51) Int. Cl.
| *G01F 1/66* | (2006.01) |
| *G01P 5/24* | (2006.01) |
| *G01P 5/14* | (2006.01) |
| *G01P 5/26* | (2006.01) |
| *G01P 21/02* | (2006.01) |
| *G01F 1/00* | (2006.01) |

(52) U.S. Cl.
CPC .............. *G01F 1/663* (2013.01); *G01F 1/002* (2013.01); *G01P 5/14* (2013.01); *G01P 5/24* (2013.01); *G01P 5/26* (2013.01); *G01P 21/025* (2013.01)

(58) Field of Classification Search
CPC ................................. G01F 1/692; G01F 1/696
See application file for complete search history.

(56) References Cited

U.S. PATENT DOCUMENTS

| 3,820,714 A | * | 6/1974 | Erickson et al. | ...... A01G 25/00 |
| | | | | 137/13 |
| 4,261,210 A | | 4/1981 | Gardner | |
| 6,137,439 A | | 10/2000 | Bradford et al. | |
| 9,677,922 B2 | | 6/2017 | Skowaisa | |

(Continued)

FOREIGN PATENT DOCUMENTS

| CN | 2716811 Y | 8/2005 |
| CN | 101598581 A | 12/2009 |

(Continued)

OTHER PUBLICATIONS

"Algorithm Determines Wind Speed and Direction From Venturi-Sensor Data" NASA Tech Briefs, XP55251213, Dec. 2004, p. 24.

(Continued)

*Primary Examiner* — Elias Desta
(74) *Attorney, Agent, or Firm* — Oblon, McClelland, Maier & Neustadt, L.L.P.

(57) ABSTRACT

The invention relates to a flow measuring instrument which ascertains the water level of a watercourse, the flow rate of the watercourse at a specific location, and the wind velocity at the location of the measuring instrument, and these three measurement data are incorporated in the calculation of the average flow rate of the watercourse and/or of the calculation of the flow. By taking the wind velocity above the watercourse into consideration, calculation of the flow can be improved.

17 Claims, 4 Drawing Sheets

(56) References Cited

U.S. PATENT DOCUMENTS

| | | | |
|---|---|---|---|
| 2003/0056584 A1* | 3/2003 | Park | G01F 1/692 |
| | | | 73/204.11 |
| 2010/0154561 A1 | 6/2010 | Cabrera et al. | |
| 2012/0079879 A1* | 4/2012 | Saito | G01F 1/6842 |
| | | | 73/114.33 |
| 2015/0375247 A1* | 12/2015 | Funseth | B05B 12/04 |
| | | | 239/68 |

FOREIGN PATENT DOCUMENTS

| | | |
|---|---|---|
| CN | 104280082 A | 1/2015 |
| DE | 27 33 306 B1 | 12/1978 |
| DE | 10 2009 042 111 A1 | 4/2010 |
| DE | 10 2013 213 345 A1 | 1/2015 |
| JP | 2004-219179 | 8/2004 |
| JP | 2004-219179 A | 8/2004 |

OTHER PUBLICATIONS

John Fulton, et al., "Measuring Real-time Streamflow Using Emerging Technologies: Radar, Hydroacoustics, and the Probability Concept" Journal of Hydrology, XP 22796303, 2008, pp. 1-10.

J.D. Creutin, et al., "River gauging using PIV techniques: a proof of concept experiment on the Iowa River" Journal of Hydrology, vol. 277, 2003, pp. 182-194.

Office Action dated Aug. 29, 2019: in China Patent Application No. 201611207074.8 (8 pgs.).

"Algorithm Determines Wind Speed and Direction From Venturi-Sensor Data"; John F. Kennedy Space Center, Florida; NASA Tech Briefs; Dec. 2004, 1 page.

* cited by examiner

FLOW MEASURING INSTRUMENT COMPRISING A WIND VELOCITY SENSOR

CROSS-REFERENCE TO RELATED APPLICATIONS

This application claims priority under 35 U.S.C. § 119 or 365 to European Application No. 15 202 464.2, filed Dec. 23, 2015. The entire contents of the above application(s) are incorporated herein by reference.

FIELD OF THE INVENTION

The invention relates to flow measurement. The invention in particular relates to a flow measuring instrument comprising a contactlessly measuring flow rate sensor and a wind velocity sensor for detecting the wind velocity at the location of the measuring instrument. The invention also relates to a method for measuring flow, to a program element and to a computer-readable medium.

TECHNICAL BACKGROUND

Various physical measured values are important when monitoring watercourses. This data can be used for statistical evaluation and as a basis for planning construction measures, as a flood warning or in the sewage industry for allocating the costs of sewage treatment.

Measurement systems are known that use the data from various sensors that is collected and evaluated in separate evaluation systems.

Radar technology is becoming increasingly widespread for measuring water levels, since, in comparison with other measurement principles such as ultrasound, it is either not affected or is only slightly affected by environmental influences such as temperature, wind or rain.

DE 10 2013 213 345 A1 describes a fill level measurement device for determining the flow rate of a watercourse, the transmitted signal of which device can be emitted in two different directions in order to measure the water level and to carry out a local Doppler measurement to determine the flow rate.

SUMMARY OF THE INVENTION

A first aspect of the invention relates to a flow measuring instrument which comprises a flow rate sensor, which preferably uses contactless measuring, for detecting a local flow rate of the watercourse. The flow measuring instrument also comprises a wind velocity sensor for detecting the wind velocity, preferably at the location at which the measuring instrument is attached. The flow rate sensor and the wind velocity sensor are part of the flow measuring instrument and are interconnected. A control unit or controller is provided, which is used to calculate the average flow rate and/or the flow of the watercourse. For this calculation, the control unit uses both the data collected by the flow rate sensor and the data collected by the wind velocity sensor, i.e. in particular the local flow rate of the watercourse determined by the sensor and the wind velocity at the location of the measuring instrument.

In addition to the local flow rate and the wind velocity, additional measurement data may be taken into account, in particular the current water level of the watercourse.

Furthermore, additional data which is stored in the flow measuring instrument, for example, can be incorporated in the calculation. In this case, this data can be in particular the profile shape of the watercourse channel and the position (x, y) of the local flow rate measurement, i.e. the location at which the measuring beam of the flow rate sensor strikes the surface of the watercourse.

If the location of the measuring instrument and thus the location of the wind velocity sensor is known, the estimated wind velocity in the region of the surface of the watercourse can be inferred from the wind velocity measured at said locations.

A selection of all the above-mentioned calculations may be carried out on the basis of a calibration, which is depicted by a table stored in a memory of the measuring instrument, for example.

According to one embodiment of the invention, the wind velocity sensor is attached to or integrated in the flow rate sensor. For example, the wind velocity sensor may be attached to the housing of the flow rate sensor, in particular to the upper side thereof, or can be passed through the housing.

According to one embodiment of the invention, the wind velocity sensor is also designed to detect the wind direction, the control unit intending to take into account the detected wind direction in order to calculate the average flow rate and/or the flow of the watercourse.

In particular, a plurality of wind velocity sensors may be provided which have different preferred directions, and the measurement results from which are taken into account altogether in order to obtain a value for the actual wind velocity and wind direction that is as accurate as possible.

These various sensors can be integrated in a complete unit or can be attached to various points of the flow rate sensor in individual units.

According to another embodiment of the invention, the flow rate sensor is designed to measure the water level and to carry out a Doppler measurement, the measurement results from which are to be taken into account by the control unit in order to calculate the average flow rate and/or the flow of the watercourse.

According to another embodiment of the invention, the wind velocity sensor comprises a tube-like or tubular region through which air passes. This tube-like region has a different cross section at different points, and therefore a pressure gradient is created by air passing through, which gradient can be detected by pressure sensors attached to or in the tube-like region in order to determine the wind velocity.

According to an embodiment of the invention, the wind velocity sensor comprises two plates or discs, arranged in parallel with one another, for air to pass through, the wind velocity of which air is to be detected. The cavity between the plates has a different cross section at different points so that pressure differences occur here too, which can be detected by accordingly attached pressure sensors in order to determine the wind velocity and optionally also the wind direction.

This arrangement may be rotationally or radially symmetrical, and therefore very different wind directions from 0 to 360 degrees can be detected.

The pressure sensors used for this may, for example, comprise a first group which is arranged in a ring. The pressure sensors arranged in a ring can be, for example, three, four or more pressure sensors, each of which is at a constant spacing from the adjacent sensor.

According to another embodiment of the invention, the control unit is designed to calculate the average flow rate and/or the flow of the watercourse, taking into account the location of the local flow rate of the watercourse. For this purpose, the measuring instrument can comprise a position sensor and/or a location sensor, which allows the measuring instrument to determine the location of the local flow rate measurement, the orientation and the location of the measuring instrument, and in particular its antenna, being determined. This is advantageous since the average flow rate and/or the flow is calculated on the basis of the cross section of the watercourse channel, the water level, the gradient of the watercourse and the location at which the local flow rate is measured, and therefore, after taking the wind velocity into account, the average flow rate and/or flow can be determined as accurately as possible.

According to another embodiment of the invention, the wind velocity sensor is attached on the upper side of the housing of the flow rate sensor. Alternatively, the wind velocity sensor can be arranged in the housing of the flow rate sensor. It is also possible for part of the wind velocity sensor to be arranged on the upper side of the housing and for a different part thereof to be arranged elsewhere on the housing.

In particular, a plurality of wind velocity sensors having different wind measurement directions can be provided.

According to another embodiment of the invention, the flow rate sensor is designed as a radar. In particular, the measuring instrument may be designed for connection to a 4-20 mA two-wire line, via which it is simultaneously supplied with power and can transmit a measured value which is proportional to the flowing current. Communication (data exchange) can also take place via the two-wire line.

According to another embodiment of the invention, the control unit is designed to calculate the average flow rate of the watercourse, taking into account the position of the flow measuring instrument and/or the orientation of the flow measuring instrument relative to the watercourse. In particular, the average flow rate can also be calculated on the basis of data contained in an electronic card or, more generally, in a geographic database, for example. This data can in particular be the orientation of the watercourse at the location at which the flow measuring instrument is mounted, the orientation of the watercourse at the location of the local flow rate measurement and optionally the geometry of the watercourse channel at these locations.

In another embodiment of the invention, the position of the flow measuring instrument and/or the orientation thereof relative to the watercourse can be detected fully automatically. For this purpose, a position sensor device and/or a location sensor device can be provided, which detects the position and/or the orientation of the flow measuring instrument relative to the watercourse. Alternatively, the position and/or orientation data can be manually entered into the measuring instrument.

The position sensor device can be a GPS sensor or another navigation satellite system, such as Galileo, GLONASS, Compass or IRNSS.

The location sensor device can be a compass and/or an inclinometer, which detects the orientation of the sensor in one dimension (compass) or in two or three dimensions (inclinometer).

According to another embodiment of the invention, the control unit is designed to access a database, in which the orientation of the watercourse at the location at which the flow measuring instrument is mounted or at the location at which the local flow measurement is measured is provided, in order to determine the orientation of the flow measuring instrument relative to the watercourse. This data could, for example, be stored in a digital card or in a geographic database.

The orientation data detected by the measuring instrument and the orientation of the watercourse obtained from the database can then be used to determine the position of the sensor relative to the watercourse. This can be carried out fully automatically once the sensor has been mounted and has been put into operation. In particular, this can take place automatically whenever the position of the sensor is changed.

According to another embodiment of the invention, the wind velocity sensor comprises a plurality of ultrasonic sensors, which are arranged on a surface of the flow rate sensor in order to detect the wind velocity and the wind direction. These ultrasonic transducers continuously emit signals, for example, and the wind velocity sensor uses variations in these signals to reliable and accurately measure the wind direction and the wind velocity.

According to another aspect of the invention, a method for measuring flow is provided, in which a local flow rate of the watercourse is first detected by means of a flow measuring instrument. At the same time, the wind velocity is detected at the location of the measuring instrument. The average flow rate and/or the flow of the watercourse is then determined from the data obtained, taking into account the local flow rate and the wind velocity. Additional data can be incorporated in this calculation, as described above.

A further aspect of the invention relates to a program element which, when implemented on a processor of a flow measuring instrument, instructs the measuring instrument to carry out the steps described above and in the following.

Another aspect of the invention proposes a computer-readable medium, on which a program element as described above is stored.

Embodiments of the invention are described in the following with reference to the figures. In the figures, the same reference signs denote the same or similar elements. However, the same or similar elements may also be denoted by different reference signs.

BRIEF DESCRIPTION OF THE FIGURES

FIG. 8b is a plan view of the flow measuring instrument in FIG. 8a.

DETAILED DESCRIPTION OF EMBODIMENTS

The views in the figures are schematic and not to scale.

Figure 1:
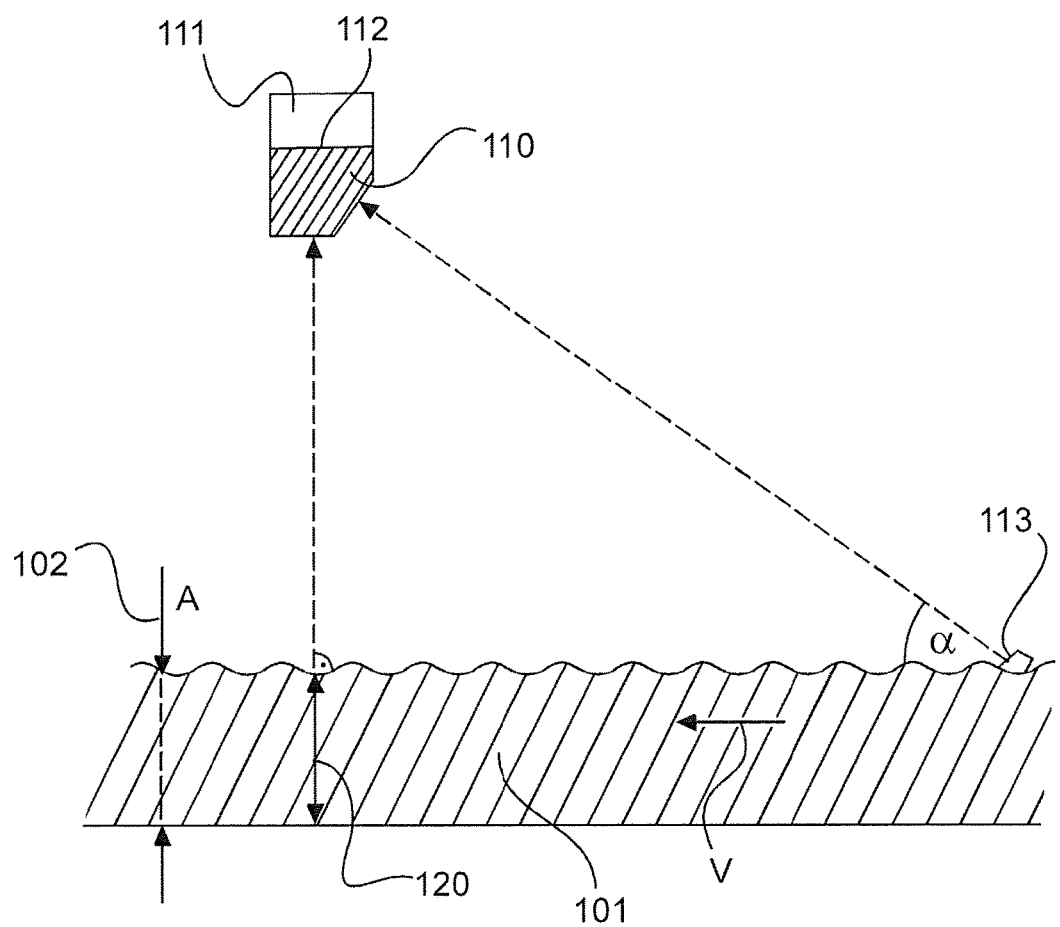
FIG. 1 shows a flow measuring instrument according to one embodiment of the invention.

FIG. 1 shows a flow measuring instrument according to one embodiment of the invention. The measuring instrument comprises a contactlessly measuring flow rate sensor 110, for example in the form of a fill level radar comprising two antennae having different main emission directions, so that two measurement signals can be emitted in different directions. The first measurement signal is emitted perpendicularly to the surface of the watercourse 101 and the second signal is emitted at an angle α thereto.

The water level 120 can be obtained from the first signal and the flow rate v of the watercourse at location 113 can be obtained from the second signal, using the Doppler principle.

A wind velocity sensor 111 is attached to the flow rate sensor 110 and, in the embodiment in FIG. 1, is located on the upper side 112 of the flow rate sensor. This wind velocity sensor 111 is used to detect the wind velocity at the location of the measuring instrument 111, 110. The wind velocity detected is used to be able to determine the flow rate of the watercourse 101 more accurately.

The combined level/Doppler measuring instrument 110, which measures the level 120 vertically downwards and measures the surface velocity of the flowing medium 101 at an angle α, has an additional wind sensor 111.

Figure 2:
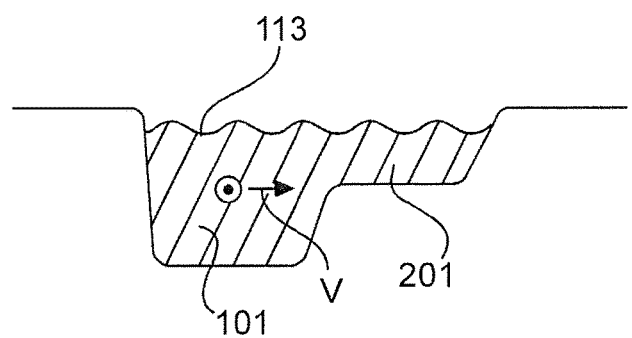
FIG. 2 shows the cross section of a watercourse channel, in which the watercourse to be measured flows.

FIG. 2 shows the cross section of the channel 201 along the sectional line 102 in FIG. 1.

The wind velocity, the water level 120, the flow rate of the watercourse surface at location 113 and the dimensions of the channel, as well as the position 113 at which the surface flow rate of the watercourse is measured, may be incorporated into the calculation of the average flow rate and/or the flow.

The level measurement and the Doppler measurement can be carried out separately. By knowing the channel cross section and taking into account both the flow rate at location 113 and the water level, a good approximation of the rate of flow can be determined. Such information is of interest in particular for forecasting flooding and for river warnings or for distributing the costs to sewage works. Due to the shallow penetration depth of radar waves into the water, the velocity at the watercourse surface is ascertained in particular by the flow measuring instrument.

In a number of applications, the velocity of the surface water is modified by the surface-proximate airflows. Therefore, if an incorrect velocity of the medium is taken as the starting point, measurement errors can result when actually measuring the flow.

By integrating the wind sensor 111 into the flow measuring instrument, said instrument is able to verify or even correct the ascertained Doppler velocity. The Doppler velocity ascertained by the measuring instrument correlates with the average flow rate of the watercourse, but does not have to correspond thereto. The average flow rate depends in particular on additional parameters, such as channel depth, channel shape, quality of the channel surface (smooth or stony), water level, gradient and of course the wind velocity and the location at which the flow rate is measured.

In order to effectively calculate the average flow rate or the flow of the watercourse, a correction table can be stored in the measuring instrument, which makes it possible to approximately determine the flow rate of the watercourse using the measured Doppler velocity, the water level and/or the current wind velocity and direction.

By contactlessly measuring the flow rate outside the flowing medium, damage or contamination of the sensor by means of floating material, mud or the like is not possible or at least not probable. In contrast with known measuring instruments, the flow measuring instrument is therefore very robust and less susceptible to errors.

In particular, various measurement scenarios can be stored in the "correction table", which take into account different channel shapes, gradients and locations for measuring the wind velocity and/or flow rate.

Figure 3:
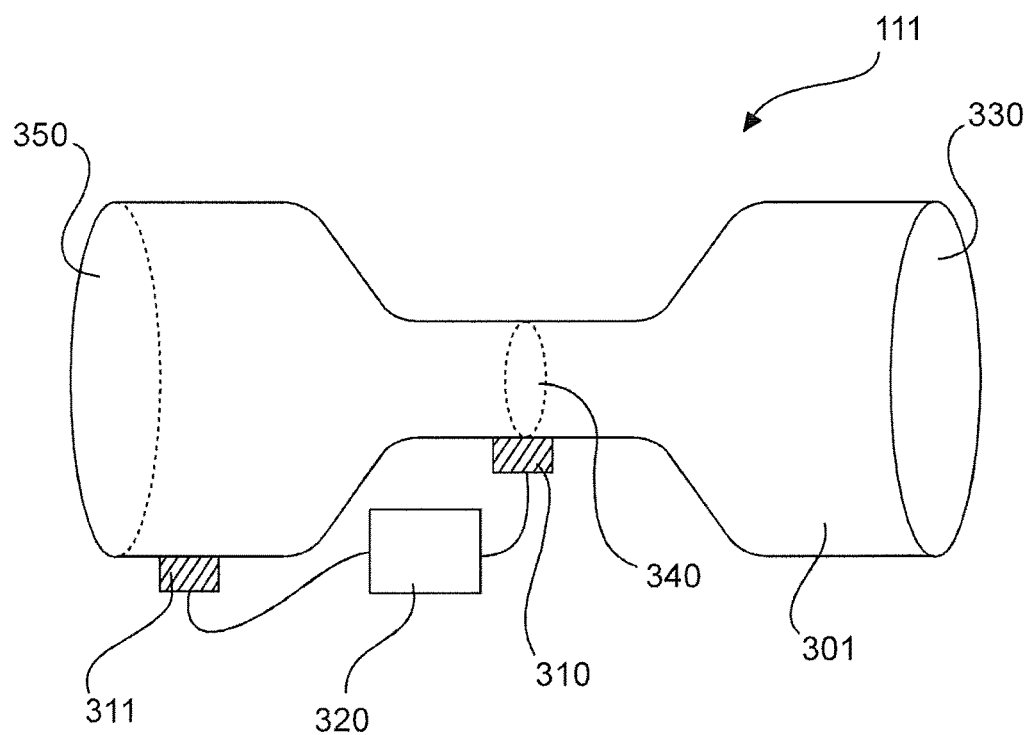
FIG. 3 shows a wind velocity sensor of a flow measuring instrument according to one embodiment of the invention.

FIG. 3 shows a wind sensor 111 for integration in a flow measuring instrument according to an embodiment of the invention. The wind sensor comprises a tubular duct 301, which can be oriented in the direction of flow of the watercourse. The channel has a cross section that is, for example, circular and has a diameter which is larger at the ends 330, 350 of the channel than in the centre 340 thereof. The diameter of the channel or tube therefore tapers at the centre thereof, so that the wind velocity is increased at this point and therefore the pressure of the air flowing through is reduced at this point.

By ascertaining the differential pressure between the correspondingly sensitive pressure sensors 310 and 311 in the evaluation unit (processor) 320 connected to said sensors, the magnitude of the wind velocity in the flow direction of the watercourse can be deduced.

The pressure sensors 310, 311 are for example arranged on the outside of the tubular duct 301, but have access to the inside of the channel in order to be able to measure the pressure there.

More than two pressure sensors can of course be arranged, as a result of which the wind velocity can be determined even more accurately.

Figure 4:
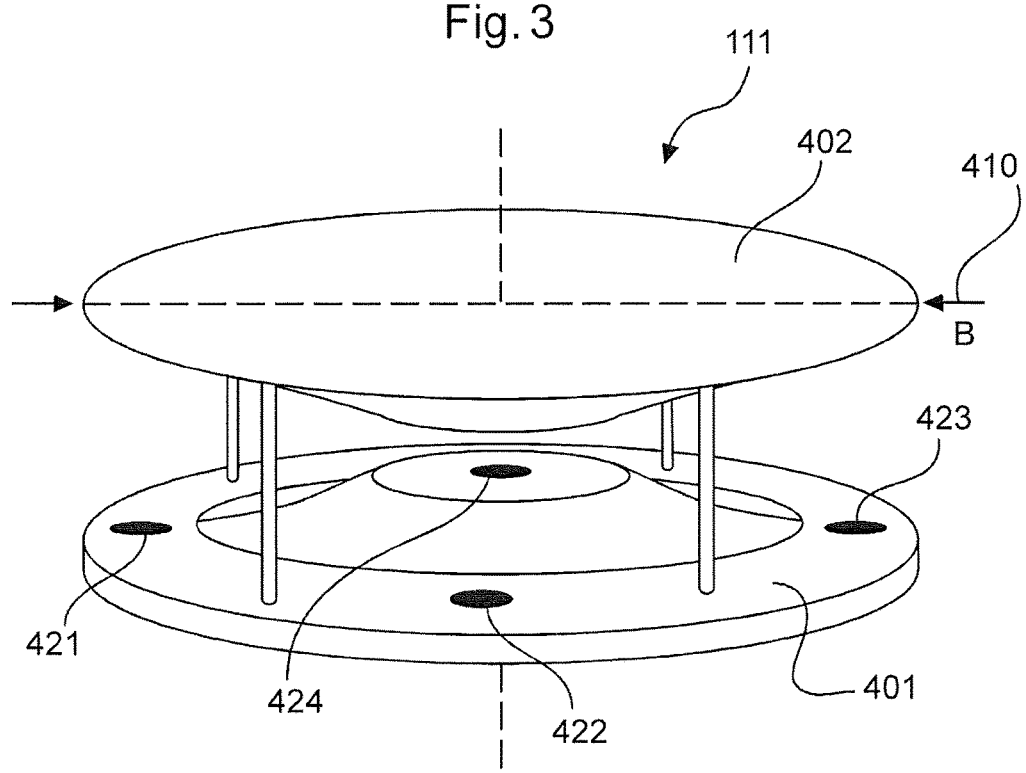
FIG. 4 shows a wind velocity sensor of a flow measuring instrument according to another embodiment of the invention.

FIG. 4 shows a wind velocity sensor 111 for a flow measuring instrument according to another embodiment of the invention. In this embodiment, the sensor comprises two rotationally symmetrical plates 401, 402, the spacing between which is reduced in the middle by a bulge. Around the edge of said bulge, at least three sensors at an angle of 120 degrees to one another, but for example also four sensors 421, 422, 423 (the fourth sensor is not visible) at a 90-degree angle to one another, are arranged concentrically to the centre of one of the plates in this case. More pressure sensors can also be arranged along this circle in the outer region of the lower plate. Likewise, corresponding pressure sensors can also be arranged on the upper plate. An additional pressure sensor 424 is located in the centre, so that the differential pressure between the outer region in which the four sensors 421, 422, 423 (the fourth is not visible) are arranged, and the central region in which the sensor 424 is arranged, can be determined.

The wind velocity sensor is open at an angular range of 360 degrees (i.e. on all sides), so that the wind direction can also be determined in addition to the wind velocity. Alternatively, the pressure sensors can also be arranged on the sloping surface 450 of the upper plate 402 or on the intersection 430 of the lower plate 401. It is also possible to arrange additional pressure sensors. All the pressure sensors are connected to the processor 320 (control unit), which can calculate the wind velocity and wind direction.

For example, the pressure sensors are integrated in the corresponding plate and have access to the chamber between the two plates, through which the wind blows.

Figure 5:
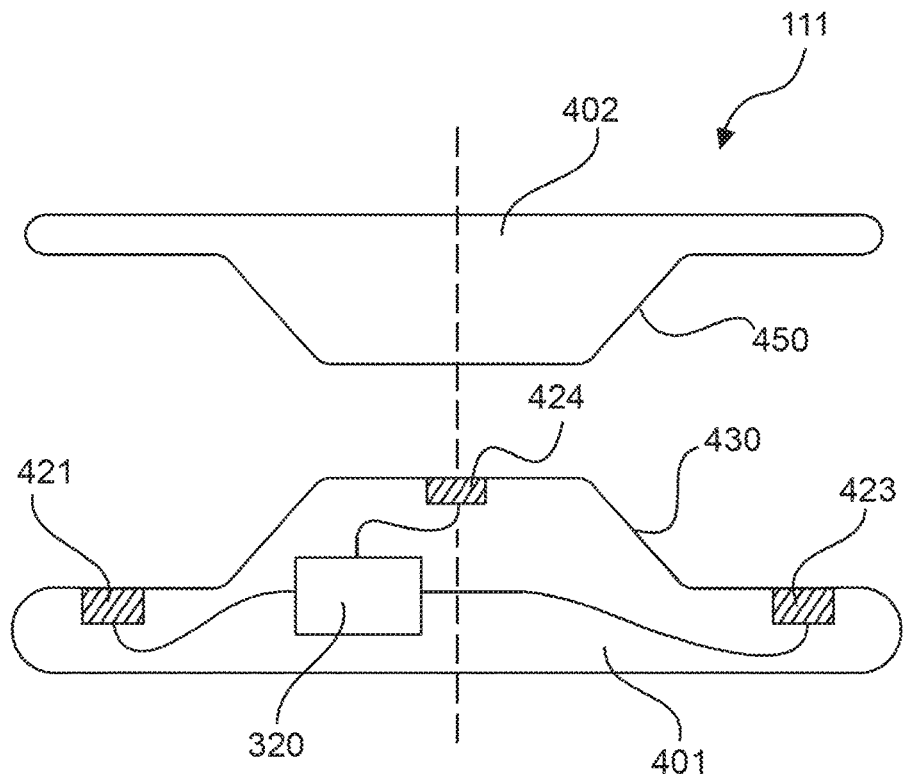
FIG. 5 is a cross-sectional view of the sensor in FIG. 4.

FIG. 5 is a cross-sectional view of the wind sensor in FIG. 4 along the line 410. In both the radially symmetrical case and in the tube according to FIG. 3, the diameter is tapered such that no undesirable vortices and turbulences develop.

Figure 6:
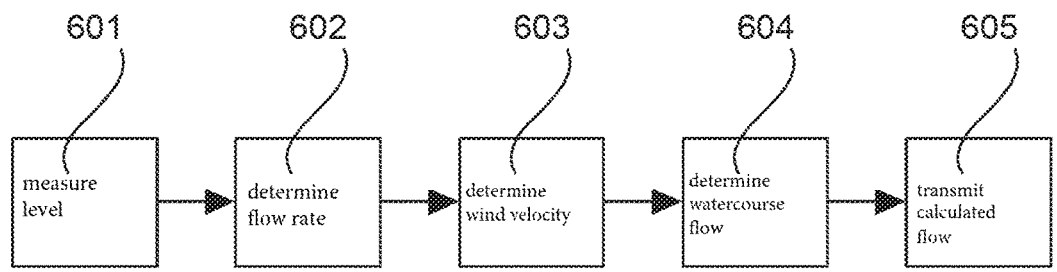
FIG. 6 is a flow diagram of a method according to one embodiment of the invention.

FIG. 6 is a flow diagram of a method according to one embodiment of the invention. In step 601, the level is measured in order to determine the level of the flowing watercourse. In step 602, the flow rate is determined in a specific region of the watercourse, for example by means of a Doppler measurement. In step 603, the wind velocity is also determined at the location of the flow measuring instrument and in step 604 the flow of the watercourse is determined, the three detected measured values being taken into account for this. Steps 601 to 603 can also be carried out in another sequence and/or at the same time.

In step 605, the flow calculated by the instrument is transmitted to an external unit.

Figure 7:
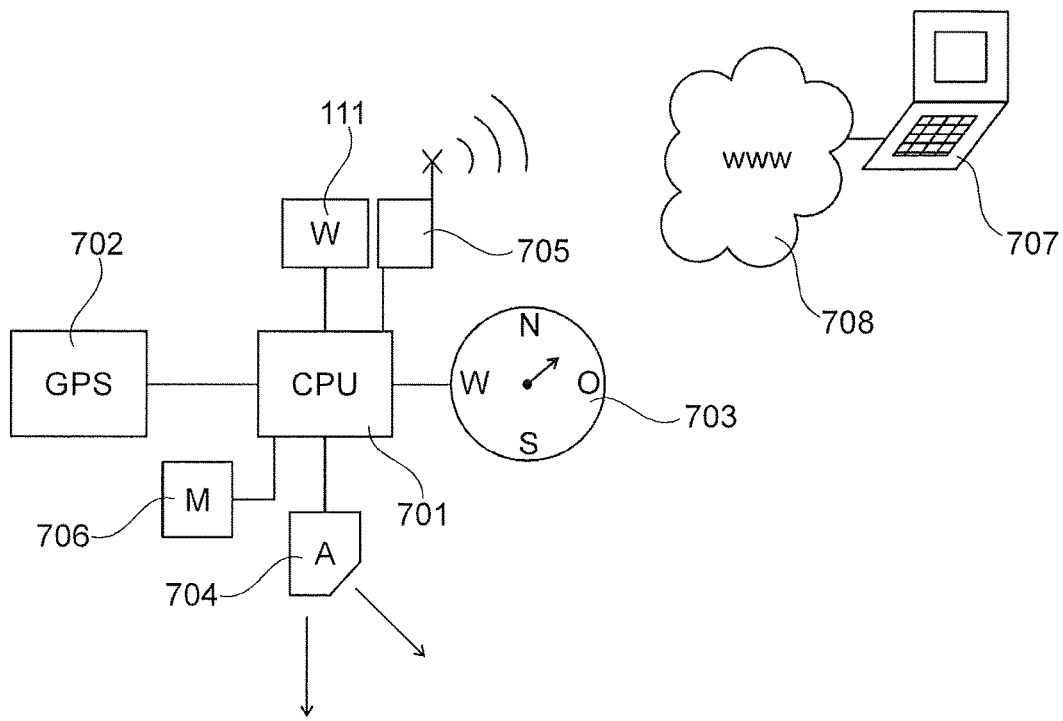
FIG. 7 shows a measurement system comprising a flow measuring instrument and a server according to one embodiment of the invention.

FIG. 7 shows a measuring system comprising a flow measuring instrument and a server 707 containing a database. The flow measuring instrument and the server can communicate wirelessly via the Internet 708. For this purpose, a communication module 705 is provided in the flow measuring instrument. The flow measuring instrument comprises a control unit 701 to which there is connected a GPS module 702 for detecting the position of the measuring instrument and a location detection unit 703 for detecting the location of the flow measuring instrument. Furthermore, the wind velocity sensor 111 and the sensor 704 for determining the fill level and the flow rate are connected to the control unit. A data memory 706 is also provided in the measuring instrument, on which memory geographic data and digital card data can be stored, for example.

Alternatively, by means of the communication device 705, the flow measuring instrument may be designed to query the wind velocity at the location at which said instrument is mounted or at the local measuring location of the measuring instrument from an external location. The current wind conditions can be stored in a database of the server 707, for example, which database can be queried via the wireless connection. In this case, installation of a wind velocity sensor can be dispensed with.

The location at which the measuring instrument is mounted can be ascertained by means of GPS or by being input by the user. The current orientation (north/south) in relation to the data in the database can be ascertained by means of a compass integrated in the measuring instrument or from an analysis of an additional (geographic) database, which provides the orientation of the watercourse at the assembly location.

If the flow measuring instrument is not mounted perpendicularly to the flow direction of the watercourse, it can be designed to calculate a correction of the measured flow rate on the basis of the deviation of its location from the perpendicular in relation to the flow direction of the watercourse. This can also take place fully automatically.

In one embodiment, the deviation of the location of the sensor from the perpendicular in relation to the flow direction of the watercourse can be ascertained automatically by the sensor, by GPS, a compass and a geographic database being used therefor.

Figure 8A:
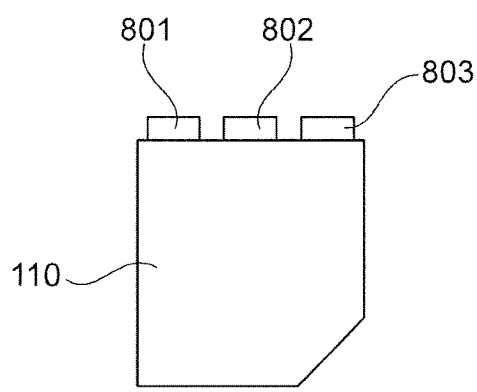
FIG. 8a shows a flow measuring instrument according to another embodiment of the invention.
Figure 8B:
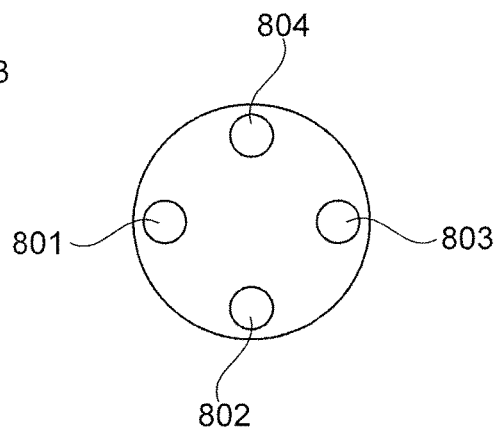

FIG. 8a shows a flow measuring instrument according to another embodiment of the invention, in which a plurality of ultrasonic sensors 801, 802, 803, 804 (cf. FIG. 8b) are attached to the upper side of the measuring instrument. The cross section of the measuring instrument is, for example, circular and four sensors 801, 802, 803, 804 are provided which are attached in various positions. These sensors are, for example, piezoelectric sensors. The sensors can be used as both transmitters and receivers and send signals to one another. The sensors can measure the degree of damping and/or Doppler shift and/or change in propagation time of the measurement signals sent. By combining these measurement results in the control unit 701 (cf. FIG. 7), the wind strength and wind direction can be deduced.

It should also be noted that "comprising" and "having" do not exclude the possibility of other elements or steps, and the indefinite articles "an" or "a" do not exclude the possibility of a plurality. It should further be noted that features or steps which have been described with reference to one of the above embodiments may also be used in combination with other features or steps of other above-described embodiments. Reference signs in the claims should not be treated as limiting.

The invention claimed is:

1. A flow measuring instrument comprising:
   a contactlessly measuring flow rate sensor configured to detect a local flow rate of a watercourse;
   a wind velocity sensor configured to detect the wind velocity;
   control circuitry configured to calculate the average flow rate of the watercourse, as a function of the local flow rate and the wind velocity.

2. The flow measuring instrument according to claim 1, wherein the wind velocity sensor is attached to the flow rate sensor or is integrated in the flow rate sensor.

3. The flow measuring instrument according to claim 1, wherein the wind velocity sensor is configured to detect the wind direction, wherein the detected wind direction is taken into account by the control circuitry in order to calculate the flow of the watercourse.

4. The flow measuring instrument according to claim 1, wherein the control circuitry is configured to take into account the position of the flow measuring instrument and/or the orientation of the flow measuring instrument relative to the watercourse in order to calculate the average flow rate.

5. The flow measuring instrument according to claim 4, further comprising:
   a position and a location sensor device configured to detect the position and the orientation of the flow measuring instrument relative to the watercourse.

6. The flow measuring instrument according to claim 4, wherein the control circuitry is configured to access a database that provides the orientation of the watercourse at the location at which the flow measuring instrument is mounted, in order to determine the orientation of the flow measuring instrument relative to the watercourse.

7. The flow measuring instrument according to claim 1, wherein the flow rate sensor is configured to measure the water level and to carry out a Doppler measurement, the measurement results from which are to be taken into account by the control circuitry in order to calculate the average flow rate or the flow of the watercourse.

8. The flow measuring instrument according to claim 1, wherein the wind velocity sensor comprises a tubular region, of varying cross section, for air to pass through, the wind velocity of which air is to be detected, and wherein a plurality of pressure sensors are arranged on or in the tubular region in order to detect a local pressure difference between the locations of the pressure sensors.

9. The flow measuring instrument according to claim 1, wherein the wind velocity sensor comprises two plates arranged in parallel with one another for the passage of air, the wind velocity of which air is to be detected, and wherein a plurality of pressure sensors are arranged on or in the region between the two plates, in order to detect local pressure differences between the locations of the pressure sensors.

10. The flow measuring instrument according to claim 1, wherein the wind velocity sensor comprises a plurality of ultrasonic sensors which are arranged on the surface of the flow rate sensor in order to detect the wind velocity and the wind direction.

11. The flow measuring instrument according to claim 1, wherein the control circuitry is configured to calculate the average flow rate and/or the flow of the watercourse, taking into account the location of the local flow rate of the watercourse.

12. The flow measuring instrument according to claim 1, wherein the wind velocity sensor is attached either to the upper side of a housing or arranged in the housing of the flow rate sensor.

13. A method for measuring flow, comprising:
detecting a local flow rate of a watercourse by a flow measuring instrument;
detecting the wind velocity at the location of the measuring instrument;
calculating, by circuitry, the average flow velocity of the watercourse, as a function of the local flow rate and the wind velocity.

14. A non-transitory computer readable medium having stored thereon a program element, which, when implemented on a processor of a flow measuring instrument, instructs the measuring instrument to carry out a method comprising:

detecting a local flow rate of a watercourse by the flow measuring instrument;
detecting the wind velocity at the location of the measuring instrument;
calculating the average flow rate of the watercourse, as a function of the local flow rate and the wind velocity.

15. The flow measuring instrument according to claim 2, wherein the wind velocity sensor is configured to detect the wind direction, wherein the detected wind direction is taken into account by the control circuitry in order to calculate the flow of the watercourse.

16. The flow measuring instrument according to claim 1, wherein the wind velocity sensor is attached to the flow rate sensor or is integrated in the flow rate sensor,
wherein the wind velocity sensor is configured to detect the wind direction, wherein the detected wind direction is taken into account by the control circuitry in order to calculate the flow of the watercourse, and
wherein the control circuitry is configured to take into account the position of the flow measuring instrument and/or the orientation of the flow measuring instrument relative to the watercourse in order to calculate the average flow rate.

17. The flow measuring instrument according to claim 5, wherein the control circuitry is configured to access a database that provides the orientation of the watercourse at the location at which the flow measuring instrument is mounted, in order to determine the orientation of the flow measuring instrument relative to the watercourse.

* * * * *